United States Patent
Sakamoto et al.

[15] 3,659,821
[45] May 2, 1972

[54] STRUCTURE FOR PLASTIC ENCAPSULATION OF SEMICONDUCTOR DEVICES

[72] Inventors: Yuzaburo Sakamoto; Keizo Otsuki, both of Tokyo, Japan

[73] Assignee: Hitachi, Ltd., Tokyo, Japan

[22] Filed: July 10, 1969

[21] Appl. No.: 840,634

[30] Foreign Application Priority Data

July 10, 1968 Japan....................................43/47752

[52] U.S. Cl.................................249/84, 18/5 E, 18/36, 18/42 D, 18/DIG. 10, 249/96, 264/272
[51] Int. Cl.......................................................B29f 1/06
[58] Field of Search..................249/84, 85, 96, 83; 18/42 D, 18/36, DIG. 29, DIG. 10, 1 D, 5 E, 30 WC; 164/112, 334; 264/272; 29/588

[56] References Cited

UNITED STATES PATENTS

| | | | |
|---|---|---|---|
| 2,369,291 | 2/1945 | Frank | 18/36 |
| 3,166,795 | 1/1965 | Joffe | 18/DIG. 10 |
| 3,391,426 | 7/1968 | Hugill | 18/36 |
| 3,413,713 | 12/1968 | Helda | 264/272 |
| 3,423,516 | 1/1969 | Segerson | 264/272 X |

Primary Examiner—J. Spencer Overholser
Assistant Examiner—Ben D. Tobor
Attorney—Craig, Antonelli and Hill

[57] ABSTRACT

An improvement in a plastic encapsulating process for semiconductor devices, wherein parts of a sheet-like thin insert are embedded in plastic material injected into cavities in a two-part mold, said insert being loaded or positioned on the cavity part of said mold, characterized in that at least either a projected or recesses portion, and correspondingly either a recessed or projected portion, have been in advance constructed respectively on each side edge of said insert and on said cavity part of the mold near the injection gate therein contacting each other so as to prevent an outflow of plastic material from said injection gate along a peripheral gap created between said side edge of the insert and the cavity part of the mold any further than their contacting point which acts as a stopper in said gap, producing an undesirable channel for plastic material to flow.

10 Claims, 7 Drawing Figures

Patented May 2, 1972

INVENTORS

YUZABURO SAKAMOTO and KEIZO OTSUKI

BY *Craig, Antonelli, Stewart & Hill*

ATTORNEYS

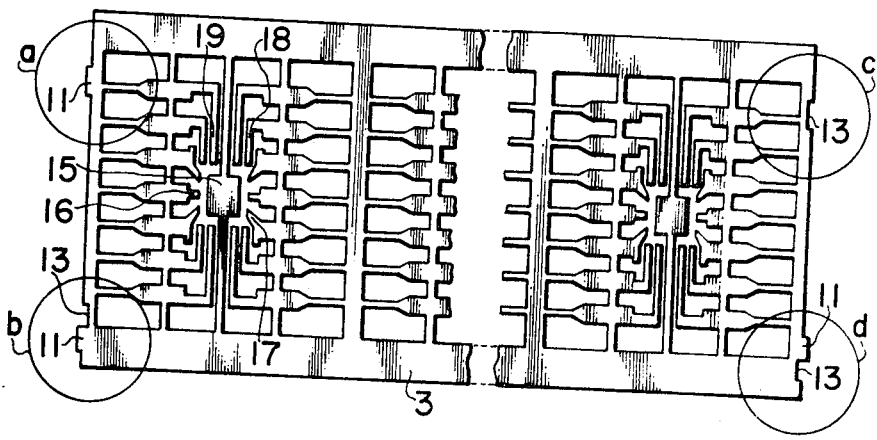
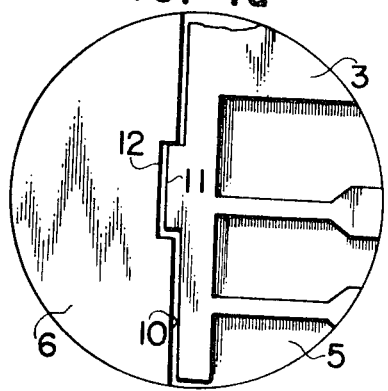
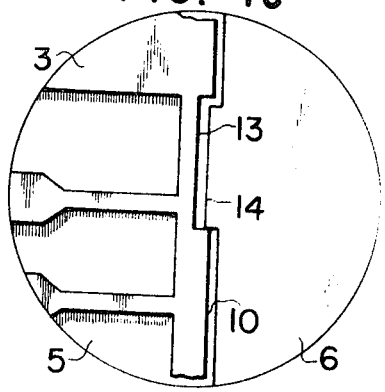
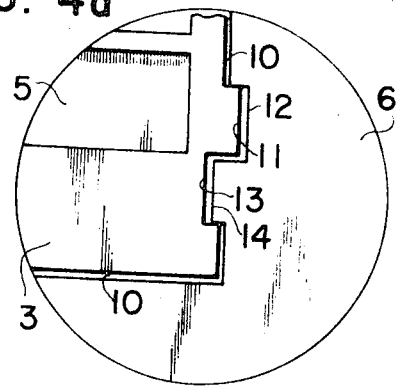
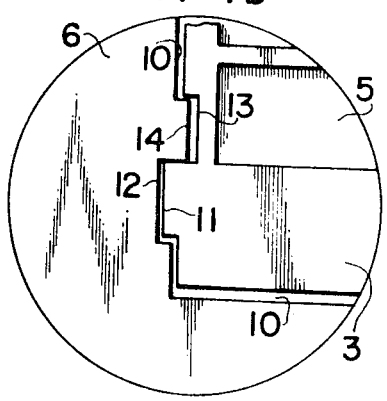

STRUCTURE FOR PLASTIC ENCAPSULATION OF SEMICONDUCTOR DEVICES

BACKGROUND OF THE INVENTION

Field of the Invention

The present invention relates to plastic encapsulation of semiconductor devices. More specifically, it relates to an improvement in the structure of a sheet-like metallic insert and two-part mold used in a plastic encapsulating process wherein parts of said insert are embedded in plastic material injected into cavities of said mold after said insert has been loaded or positioned on the cavity part of said mold.

Description of the Prior Art

For manufacturing small electronic devices, there is required a plastic encapsulating process wherein parts of a sheet-like metallic insert are embedded in plastic material while other parts of said insert are permitted to extend out of the plastic material to serve as electrode leads. Transfer molding, utilizing a two-part mold to embed desired parts of a sheet-like metallic insert, is much employed for the aforementioned plastic encapsulating process.

In order to carry out the afore-mentioned process successfully to obtain desirable and satisfactory electronic devices, however, the structure of the sheet-like metallic insert and the cavity part of the two-part mold must be very accurately constructed. Otherwise, since freely running plastic material is commonly used in transfer molding, a phenomenon results wherein an outflow of plastic material occurs through a small peripheral gap between said insert and cavity part of the mold near the injection gate where the injection pressure is especially high. Therefore, as a result of an outflow of plastic material into unprescribed and undesired spots, the injection pressure decreases with the resulting occurrence of inferior molding. To prevent an outflow of plastic material, it may be possible to construct the metallic insert and the two-part mold with sufficient accuracy to prevent leaks, but such highly accurate construction of the metallic insert and the two-part mold, and especially the metallic insert, can be achieved only at high cost. Thus, it is difficult to achieve such ends within the limits of commercial practicality.

SUMMARY OF THE INVENTION

Therefore, it is an object of the present invention to achieve by a process of transfer molding a successful plastic encapsulation of small electronic devices that are satisfactory.

It is a further object of the present invention to keep the cost of the subject process low so that the present invention may be well utilized.

According to the present invention, the foregoing and other objects are accomplished by a configuration of the metallic insert and the two-part mold such that an outflow of plastic material from the injection gate along a gap created between the side edge of said insert and the cavity part of the two-part mold at the time of loading the former on the latter is stopped at the contacting point of these elements with each other which acts as a stopper in said gap, providing an undesirable channel for plastic material to flow.

Therefore, in order to provide the above-mentioned contacting point of the metallic insert and the cavity part of the two-part mold with each other, according to the present invention, either a projection or a recess is constructed on each side edge of said insert and correspondingly either a recess or a projection is constructed on said cavity part of the mold near the injection gate therein.

The plastic encapsulating process according to the present invention applies to the manufacture of small electronic devices and especially of semiconductor integrated circuit devices.

BRIEF DESCRIPTION OF THE DRAWING

The present invention may be better understood by reference to the following detailed description of a specific embodiment thereof taken in conjunction with drawing wherein:

FIG. 3 shows a lead-frame as an insert used in the plastic encapsulating process according to the present invention.

FIGS. 4a through 4d show enlarged views of parts of a lead-frame shown in FIG. 3 and the cavity part of a two-part mold.

DESCRIPTION OF THE PREFERRED EMBODIMENT

Figure 1:
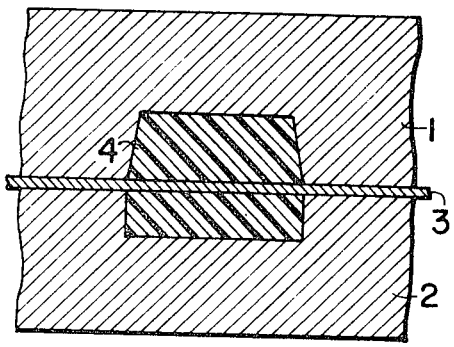
FIG. 1 is a cross section showing the positional relationship of a two-part mold, an insert, and plastic material.

According to the present invention, as shown in FIG. 1, a two-part mold consisting of the plunger part 1 and the cavity part 2 is used to embed a part of a metallic insert 3 in plastic material 4.

Figure 2:
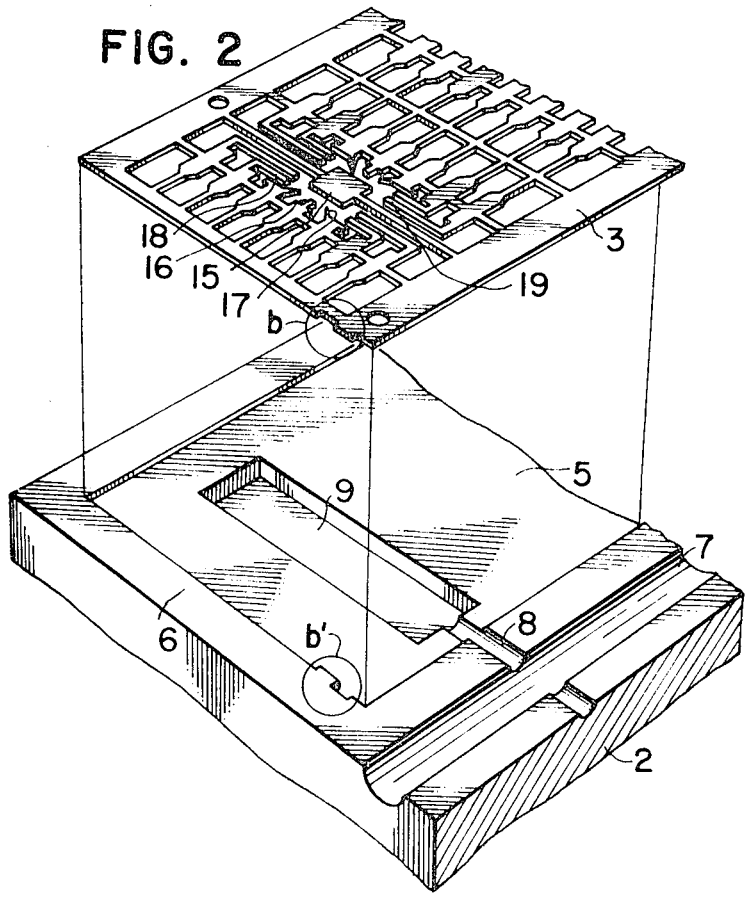
FIG. 2 is a partial perspective view of the cavity part of a two-part mold and a metallic insert used in the plastic encapsulating process according to the present invention.

In FIG. 2, a lead-frame 3 for manufacturing semiconductor integrated circuit devices is used as an insert according to the present invention. About 0.25±0.02 mm thick cobalt sheet is stamped out into the proper pattern for the lead-frame 3. Then, the electrode leads-to-be 16, 17, 18 and 19 are properly connected through metallic thin wires (not shown) to a semiconductor pellet (not shown) placed on a part 15 of the lead-frame 3. The part 15 and at least a part of each electrode lead near the part 15 are generally plated with gold.

The above-mentioned lead-frame 3 has an indented portion or a projection and recess, circled and denoted by "b" in FIG. 2, in the form of an adjacent tooth and gap constructed on a side edge thereof according to the present invention. Then, the lead-frame 3 is loaded or placed on the surface 5 of the cavity part 2 of the two-part mold which also has an indented portion or a projection and a recess, circled and denoted by "b'" in FIG. 2, in the form of an adjacent gap and tooth constructed in a wall of the intercellular cavity thereof corresponding to that of the projection and recess portion "b" of the lead-frame 3.

After the two-part mold is closed, that is the plunger part 1 coincides with the cavity part 2 at the surface 6 thereof, a certain plastic material is transferred into a cavity 9 through transfer guide 7 and gate 8 to embed a part of the lead-frame 3. An epoxy resin is commonly used for the aforementioned plastic material. In the embodiment of the present invention, SCM—11 Hysol (epoxy resin compounds and amine and anhydride hardners) is used. It is desirable that the spiral flow of epoxy resin is 30 — 36 inches with the minimum of 21 inches. Test for spiral flow is by the method of Epoxy Molding Materials Institute, the Society of the Plastics Industry, Inc., 250 Park Avenue, New York, New York 10017. Among several molding processes, transfer molding is applied for the above process and performed at the temperature of 150° C ±5° for the cure time of 2.5 minutes in the embodiment of the present invention. In the aforementioned transfer molding, transfer pressure must be about 200 psi with the minimum of 40≈50 psi and clump pressure 2,000 psi.

When the lead-frame 3 is placed in the intercellular cavity of the cavity part 2 of the two-part mold, there are usually peripheral gaps 10, as shown in FIGS. 4a through 4d, between the side edges of the lead-frame 3 and the walls of the intercellular cavity unless the lead-frame 3 and cavity part 2 of the mold are constructed in a highly accurate manner at increased cost. In the present invention, however, the gaps 10 are cut off at points of contact of the indented portions 11, 12, 13 and 14 of the lead-frame 3 and cavity part 2 of the mold. Thus, the interengaging tooth and gap combinations serve to cut short the peripheral flow path for the plastic material.

A thin metal sheet is stamped out into a pattern of lead-frame 3 with various indented portions on the subtending side edges as shown in FIG. 3. A rolled thin metal sheet may be cut into a desired size of a lead-frame in conveyance if the indented portions are such that one side edge is set against the opposite side edge. It should be noted also that a lead-frame need not have all the indented portions shown in FIG. 3 but may have only a projected or recessed portion on each side edge. On the other hand, additional indented portions may also be provided, so as to provide interengaging tooth and gap combinations on all four sides of the mold.

When a fluid epoxy resin is transferred into cavities 9 (only one of which is shown in FIG. 2) in the two-part mold through transfer guide 7 and gate 8, the lead-frame 3 may be pushed by the transfer pressure of epoxy resin against a wall of the intercellular cavity opposite of the transfer gate 8 of the cavity part 2 of the mold. The lead-frame 3, however, is stopped from being pushed further at points of contact of the above-mentioned indented portions 11, 12, 13 and 14 as shown in FIGS. 4a, 4b, 4c and 4d, and at the same time contact points of high pressure are created between the interengaging teeth and gaps to prevent flow of material thereby.

In FIGS. 4a, 4b, 4c and 4d, it is assumed that the lead-frame 3 is pushed by the transfer pressure of the epoxy resin from below. FIG. 4a shows that a projected or tooth portion 11 of the lead-frame 3 is in contact with the upper side of a recessed or gap portion 12 of the cavity part 2; FIG. 4b shows the same; FIG. 4c shows that the lower side of a recessed or gap portion 13 of the lead-frame 3 is in contact with a projected or tooth portion 14 of the cavity part 2; and FIG. 4d shows that a projected or tooth portion 11 and the lower side of a recessed or gap portion 13 of the lead-frame 3 are in contact respectively with the upper side of a recessed or gap portion 12 and a projected or tooth portion 14 of the cavity part 2.

Unless the configuration of the lead-frame 3 and the cavity part 2 are highly accurate, there are gaps 10 created between the side edges of the lead-frame 3 and the walls of the intercellular cavity of the cavity part 2 of the mold, as shown in FIGS. 4a through 4d. A part of the epoxy resin, therefore, runs into gaps 10 since the epoxy resin used in the process is freely running. The foregoing phenomenon is the beginning of an outflow of epoxy resin into undesired spots which causes a fall in the transfer pressure.

According to the present invention, however, the undesirable channel for resin flow is cut into pieces by points of contact of the indented portions 11, 12, 13 and 14 of the lead-frame 3 and cavity part 2 of the mold, as shown in FIGS. 4a through 4d. Thus, the above-mentioned outflow of epoxy resin into gaps 10 is stopped short, so that the transfer pressure is not caused to fall and the encapsulation of the lead-frame 3 is satisfactorily completed.

As described above with reference to the embodiment according to the present invention, it is possible to prevent an outflow of plastic material in gaps between an insert and the cavity part of a two-part mold further than a constructed point of the insert and cavity part of the mold in a transfer molding process for an encapsulation of the insert with plastic material. Transfer pressure does not fall much during the process, and a successful molding is achieved to obtain satisfactory and desirable electronic devices.

While the invention has been specifically shown and described with reference to preferred embodiments thereof, it will be understood by those skilled in the art that changes and modifications may be made therein without departing from the spirit and scope thereof.

We claim:

1. In combination, a thin metallic insert having inside parts and a frame for holding the inside parts unitarily, and a mold having a space for receiving the frame of said metallic insert, a cavity corresponding to said inside parts of the insert and gate means for injecting fluid plastic material into said cavity of the mold to embed said inside parts of the insert in plastic material, wherein the improvement comprises first and second means provided on said frame of said insert and said mold, respectively, for preventing flow of said fluid plastic material along a peripheral gap formed between said frame and the inner wall of said space facing said frame, each of said first and second means comprising at least one adjacent tooth and gap combination positioned so that the tooth of one combination engages with the gap of the other combination.

2. The combination of claim 1 wherein said first and second means are positioned on opposing portions of said frame and said mold, respectively, near said gate means.

3. The combination of claim 1 wherein said first and second means each comprise plural spaced tooth and gap combinations provided along opposite sides of said frame.

4. The combination of claim 3, wherein said gate means is provided along one side of said mold adjacent a side of said frame which is transverse to said opposite sides on which said tooth and gap combinations are provided so that the force of the injected plastic material against said metallic insert causes said teeth and gaps to form contact points.

5. In combination, a thin metallic insert having inside parts and a frame for holding the inside parts unitarily, and a mold having a space for receiving said frame of the metallic insert, a cavity corresponding to said inside parts of the insert and gate means for injecting fluid plastic material into said cavity of the mold to embed said inside parts of the insert in plastic material, wherein said metallic insert has at least one combination of a projection and a recess formed along a side edge of the frame of said insert so as to face the inner wall of said mold when said insert is positioned in the space of said mold, and said mold has a combination of a recess and a projection corresponding to and engaging with said projection and said recess of said insert whereby leakage of the fluid plastic material flowing through said gap is stopped by the corresponding projection-recess combinations.

6. The combination of claim 5, wherein said insert has at least one combination of a projection and a recess on each side edge of the frame thereof, and said mold has at least one combination of a recess and a projection at the position thereof corresponding to the respective combination of the projection and the recess.

7. In combination, a thin metallic insert having inside parts and a frame for holding the inside parts unitarily, and a mold having a space for receiving said frame of the metallic insert, a cavity corresponding to said inside parts of the insert and gate means for injecting fluid plastic material into said cavity of the mold to embed said inside parts of the insert in plastic material, wherein said metallic insert has at least a projected portion on one and a recessed portion on the other side edge of the frame of said insert so as to face the inner wall of said mold when said insert is positioned in the space of said mold, and said mold has a recessed and a projected portion on portions thereof respectively corresponding to and engaging with said projected and said recessed portion of the insert, whereby leakage of the fluid plastic material flowing through said gap is stopped by the corresponding projection-recess combinations.

8. In combination, a thin metallic insert having inside parts and a frame for holding the inside parts unitarily, and a mold having a space for receiving said frame of the metallic insert, a cavity corresponding to said inside parts of the insert and gate means for injecting fluid plastic material into said cavity of the mold to embed said inside parts of the insert in plastic material, wherein said frame of the metallic insert constitutes a closed enclosure surrounding said inside parts and has an indented portion at an outer side edge thereof so as to face the inner wall of said mold when said insert is positioned in the space of said mold, and said mold has an indented portion corresponding to and engaging with said indented portion of said insert, whereby leakage of the fluid plastic material flowing through said gap is stopped by the engaged combination of the indented portions.

9. The combination of claim 8, wherein said insert has at least a projected portion on one and a recessed portion on the opposite side edge of the frame thereof, and said mold has at least a projected portion and a recessed portion on positions thereof respectively corresponding to said projected and recessed portions of the insert.

10. The combination of claim 8, wherein said insert has at least a projection-recess portion on each side edge of the frame and said mold has at least a recess-projection portion at positions thereof corresponding to said projection-recess portions of the insert.

* * * * *